(12) United States Patent
Watanabe et al.

(10) Patent No.: US 7,822,321 B2
(45) Date of Patent: Oct. 26, 2010

(54) IMAGE PICKUP DEVICE AND REPRODUCTION CONTROL METHOD

(75) Inventors: Katsuhiko Watanabe, Saitama (JP); Tetsuo Morimoto, Kanagawa (JP); Kenichiro Imai, Kanagawa (JP); Kou Kobayashi, Tokyo (JP)

(73) Assignee: Sony Corporation (JP)

( * ) Notice: Subject to any disclaimer, the term of this patent is extended or adjusted under 35 U.S.C. 154(b) by 1030 days.

(21) Appl. No.: 11/511,108

(22) Filed: Aug. 28, 2006

(65) Prior Publication Data

US 2007/0140661 A1    Jun. 21, 2007

(30) Foreign Application Priority Data

Aug. 30, 2005    (JP)    ............................ P2005-249462

(51) Int. Cl.
*H04N 5/76*    (2006.01)

(52) U.S. Cl. .................................. 386/117; 348/222.1

(58) Field of Classification Search .................. 386/46, 386/83, 107, 117, 120, 124–126; 348/222.1, 348/231.2, 231.3, 231.6
See application file for complete search history.

(56) References Cited

U.S. PATENT DOCUMENTS

| | | | | |
|---|---|---|---|---|
| 6,774,940 | B1 * | 8/2004 | Ogura et al. ............ | 348/231.99 |
| 7,430,362 | B2 * | 9/2008 | Kudo ............................ | 386/83 |
| 2005/0259164 | A1 * | 11/2005 | Kudo ....................... | 348/231.2 |
| 2006/0171686 | A1 * | 8/2006 | Maeda ........................ | 386/117 |

FOREIGN PATENT DOCUMENTS

| | | |
|---|---|---|
| JP | 2127230 | 5/1990 |
| JP | 7-007647 A | 1/1995 |
| JP | 2000-287163 A | 10/2000 |
| JP | 2000-331466 A | 11/2000 |
| JP | 2002-112087 A | 4/2002 |
| JP | 2003-309790 A | 10/2003 |

* cited by examiner

*Primary Examiner*—David E Harvey
(74) *Attorney, Agent, or Firm*—Lerner, David, Littenberg, Krumholz & Mentlik, LLP (57) ABSTRACT

An image pickup device includes an image pickup including an image pickup lens system and an image pickup element operable to obtain a pickup image; a recording device operable to record image data based on the pickup image to a predetermined recording medium; a reproducing section operable to reproduce the image data recorded in the recording medium; and a reproduction controller operable to control switching between an image pickup mode in which the image pickup operation by the image pickup and recording of the image data by the recording device are possible, and a reproduction mode in which the reproduction of the image data by the reproducing section is possible, to control the reproduction of the image data based on a last recorded image when the mode is changed to the reproduction mode for the first time after recording of the image data in the image pickup mode, and to control the reproduction of the image data based on a point at which the reproduction has been terminated in the previous reproduction mode when the mode is changed to the reproduction mode other than the first time after recording of the image data in the image pickup mode.

6 Claims, 4 Drawing Sheets

IMAGE PICKUP DEVICE AND REPRODUCTION CONTROL METHOD

CROSS-REFERENCE TO RELATED APPLICATIONS

The present application claims priority from Japanese Patent Application No. JP 2005-249462 filed on Aug. 30, 2005, the disclosure of which is hereby incorporated by reference herein.

BACKGROUND OF THE INVENTION

1. Technical Field

The present invention relates to an image pickup device such as a digital still camera or a digital video camera, and a reproduction control method.

2. Related Art

Some digital still cameras, for example, are arranged to reproduce and display the image data (the last recorded image) recorded last before they are switched to the reproduction mode after recording the pickup image considering the convenience of checking the recorded image. The digital still camera in the background art is arranged to always reproduce and display the last recorded image when making the transition to the reproduction mode in order for achieving such a function.

Meanwhile, some image reproduction devices without the image pickup function are arranged to start reproducing and displaying from the last reproduced and displayed image data when restarting the image reproduction once terminated in order for enhancing the reproduction function. Such a function is called a resume reproduction function.

JP-A-2003-309790 is exemplified as a related art document.

Incidentally, taking the digital still camera from two aspects, namely as an image pickup/recording device and as a reproducing device for the pickup/recorded image, nothing can be done better than enhancing the conveniences as both the recording device and the reproducing device.

However, in the past, no proposal has been made regarding how to satisfy both of the function of reproducing the last recorded image and the resume reproduction function described above, and accordingly, the both functions are left incompatible at present.

SUMMARY OF THE INVENTION

Accordingly, an image pickup device according to an embodiment of the invention includes the following elements.

Namely, there is provided image pickup means including an image pickup lens system and an image pickup element for obtaining a pickup image.

Further, there is provided recording means for recording image data based on the pickup image to a predetermined recording medium.

Further, there is provided reproducing means for reproducing the image data recorded in the recording medium.

Further, there is provided reproduction control means for controlling switching between an image pickup mode in which the image pickup operation by the image pickup means and recording of the image data by the recording means are possible, and a reproduction mode in which the reproduction of the image data by the reproducing means is possible, for controlling the reproduction of the image data based on a last recorded image when the mode is changed to the reproduction mode for the first time after recording of the image data in the image pickup mode, and for controlling the reproduction of the image data based on a point at which the reproduction has been terminated in the previous reproduction mode when the mode is changed to the reproduction mode other than the first time after recording of the image data in the image pickup mode.

According to an embodiment of the invention, when the image pickup/recording is performed in the image pickup mode, the image reproduction based on the last recorded image can be performed when the mode is changed to the reproduction mode immediately thereafter. Thus, the user can quickly make the picked-up/recorded image be displayed for checking by changing the mode to the reproduction mode, and as a result, the convenience as the image pickup device can be enhanced.

Meanwhile, when the mode is changed to the reproduction mode other than when performing the image pickup/recording in the image pickup mode (namely, for example, after the power is turned OFF in the reproduction mode, or when the mode is changed to the image pickup mode from the reproduction mode, but no recording is performed there), the image reproduction is performed based on the reproduction terminating point. When the mode is changed other than when performing image pickup/recording in the image pickup mode can be regarded as a process of image reproduction. And accordingly, since the image reproduction based on the reproduction terminating point can be performed as described above, the convenience as the reproducing device can be maintained.

Therefore, according to an embodiment of the invention, both convenience as an image pickup device capable of quickly reproducing the picked-up/recorded image data by changing the mode to the reproduction mode, and convenience that the continuity of the reproduced images is maintained when using the image pickup device as the image reproducing device can be satisfied.

Further, such an advantage of the embodiment of the invention can be obtained simply by an operation of the image pickup mode/reproduction mode changeover, which has also been performed in the past. Further, according to this feature, it can be said that there is also an advantage that no other operation element is required for obtaining such an advantage of the embodiment of the invention.

BRIEF DESCRIPTION OF THE DRAWINGS

The invention will now be described with reference to the accompanying drawings, wherein like numbers refer to like elements.

DETAILED DESCRIPTION

Hereinafter, the best mode (hereinafter referred to as an embodiment) for putting the invention into practice will be explained.

Figure 1:
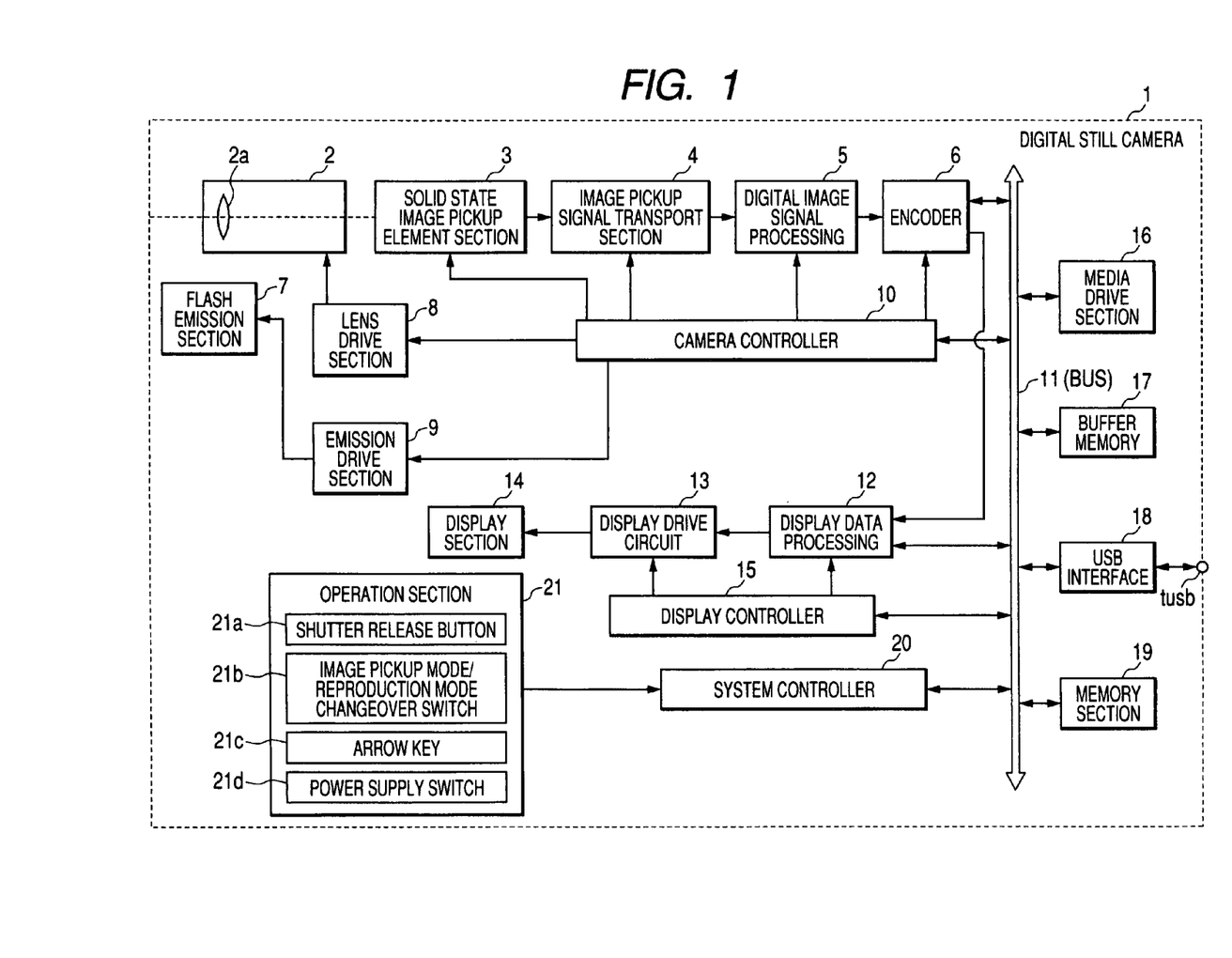
FIG. 1 is a block diagram showing an internal configuration of an image pickup device as an embodiment of the invention.

FIG. 1 is a block diagram showing the internal configuration of a digital still camera 1 as the image pickup device of the embodiment.

The digital still camera 1 is provided with a media drive section 16, and is configured to be able to record the pickup image data in a recording medium loaded in the media drive section 16. Further, it is also provided with a display section 14 in addition thereto as shown in the drawing, and is arranged to be able to reproduce and display the image data recorded in the recording medium.

Further, the digital still camera 1 is arranged to be able to perform image-pickup/recording and reproducing/displaying of the moving image data in the form of MPEG-1 (MPEG: moving picture experts group) or the like in addition to the still image data in the form of, for example, the joint photographic experts group (JPEG) or the like.

Firstly, in FIG. 1, a system controller 20 functions as a control section for the overall image pickup device, and performs control for a image pickup operation, an image reproduction operation, a display operation of a display section 14, detection of user operations, a transition process of the operation state, control of communication with external equipment, and so on. The system controller 20 performs communication of data and control information with each of the sections via a bus 11 shown in the drawing.

As shown in the drawing, the system controller 20 is connected to the various sections such as a memory section 19, a universal serial bus (USB) interface 18, a buffer memory 17, a media drive section 16, an encoder 6, a camera controller 10, a display data processing section 12, and a display controller 15 via the bus 11.

The memory section 19 inclusively shows storage means such as a ROM and a RAM equipped to the system controller, 20 or a nonvolatile memory.

The ROM in the memory section 19 stores a program executed by the system controller 20, various processing coefficients, and so on. Further, the nonvolatile memory stores information necessary to be held also in the power-off state, such as various coefficients or setting information. For example, information regarding a resume point described later is stored in the nonvolatile memory.

Further, an operation section 21 is connected to the system controller 20. The operation section 21 is provided with various operation elements disposed so as to be exposed outside the housing of the digital still camera 1, and the system controller 20 controls various necessary sections so that the operation corresponding to the operation information obtained according to each of the operation elements is executed. Thus, the user is allowed to instruct the digital still camera 1 to perform various operations.

As the various operation elements provided to the operation section 21, a shutter button 21a, an image pickup mode/reproduction mode changeover switch 21b, an arrow key 21c, a power supply switch 21d all shown in the drawing, and so on can be cited.

The shutter button 21a is an operation element used for giving the instruction to acquire mainly the pickup image and record it to the recording medium. The image pickup mode/reproduction mode changeover switch 21b is an operation element used for switching the digital still camera 1 between the image pickup mode and the reproduction mode.

It should be noted that the control processes performed by the system controller 20 in accordance with the operations of the shutter button 21a and the image pickup mode/reproduction mode changeover switch 21b will be described later.

Further, the arrow key 21c is an operation element for instructing various directions, forwarding/back-feeding of reproduced images, and so on. Further, the power supply switch 21d is an operation element for powering ON/OFF the digital still camera 1.

Further, the system controller 20 is allowed to perform data communication with external equipment (e.g., a personal computer) connected via the USB terminal tusb shown in the drawing with the USB interface 18 connected via the bus 11.

The media drive section 16 performs recording and reproduction of the recording medium as the loaded removable medium under the control of the system controller 20. For this purpose, there are provided an encoder section for encoding data to be recorded on the recording medium into a predetermined recording format, a decoder section for decoding the reproduction data from the recording medium, and so on.

The buffer memory 17 is provided for performing buffering of the data to be transformed to the media drive section 16 and recorded on the recording medium, or for performing buffering of the data retrieved from the recording medium in the media drive section 16.

Further, the digital still camera 1 is provided with a image pickup processing system and a display processing system for performing an actual image pickup operation and an image display operation, respectively.

Firstly, the image pickup processing system includes a lens system 2 including an image pickup lens 2a, a solid state image pickup section 3 as an image sensor, an image pickup signal transfer section 4, a digital image signal processing circuit 5, the encoder 6, a flash emission section 7, a lens drive section 8, an emission drive section 9, and a camera controller 10.

The lens system 2 is arranged to be a lens optical system equipped with the image pickup lens 2a, a focus lens, and a zoom lens, and transmits the image pickup light from the object to the solid state image pickup element section 3.

The solid state image pickup element section 3 is configured as, for example, a charge coupled device (CCD) sensor array or a complementary metal oxide semiconductor (CMOS) sensor array.

The image pickup signal transfer section 4 performs transferring, sampling, and gain controlling of the signal obtained by each of the image pickup elements of the solid state image pickup element section 3, and further performs A/D conversion to generate digital image data by the image pickup, and transfers it to the digital image signal processing circuit 5.

The digital image signal processing circuit 5 performs various image signal processes such as a white balance process and a Y/C process on the pickup image data obtained from the image pickup signal transfer section 4.

The encoder 6 performs a compressing process, a formatting process, and soon on the pickup image data processed in the digital image signal processing circuit 5. It is arranged to generate still image data in the form of JPEG or moving image data in the form of MPEG-1, for example.

The lens drive section 8 drives the focus lens or the zoom lens in the lens system 2.

The emission drive section 9 performs the flash emission drive of the flash emission section 7.

The camera controller 10 controls the operation of the image pickup processing system in accordance with the instruction from the system controller 20.

Further, as the display process system described above, there are provided the display section 14 such as a liquid crystal display, a display drive circuit 13, a display data processing section 12, and a display controller 15.

The display data processing section 12 stores the display data (image data) supplied from the system controller 20 connected via the bus 11 or the image pickup processing system described above. Further, it performs a decoding process, an RGB process, and so on necessary for the display output.

The display drive circuit 13 acquires the display data, which is stored in the display data processing section 12, processed with the necessary signal processes, and formed as the R, G, B signals, and drives the display section 14 based thereon to perform the image display.

The display controller 15 controls the operation of the display processing system.

It should be noted that the digital still camera 1 is provided with two modes, namely the image pickup mode for image pickup and recording the pickup image and the reproduction mode for performing the reproduction display of the recoded image.

In the image pickup mode, the operation of the image pickup processing system is turned on forming a condition in which generation and recording of the pickup image data are enabled. The system controller 20 firstly controls the image pickup signal transfer section 4, the digital image signal processing section 5, and the encoder 6 to perform the acquisition of the image of the object and the image signal processing by the instruction to the camera controller 10 in the case in which the image pickup mode is designated by the image pickup mode/reproduction mode changeover switch 21b in the operation section 21 described above. In this case, in the period before the user pushes the shutter button 21a provided to the operation section 21, the image (moving image) output from the encoder 6 is transferred to the display data processing section 12, and is displayed on the display section 14 by the display drive circuit 13. Namely, it is arranged that the user can confirm the shooting object.

When the user pushes the shutter button 21a, the system controller 20 performs control for recording the object image (still image) at that moment as the pickup image data, and instructs the camera controller 10 to output one frame of image data acquired when the shutter is operated from the encoder 6 via the bus 11. The pickup image data is supplied to the media drive section 16 as the record data via the buffer memory 17 under the control of the system controller 20, and is recorded in the recording medium.

Further, it is also possible that the pickup image data is also supplied to the display data processing section 12 to be displayed on the display section 14 by the display drive circuit 13 so that the user can check the pickup image.

Further, the camera controller 10 controls the lens drive section 8 to perform the automatic focus operation and the zoom operation in accordance with the instruction from the system controller 20 based on the user operation or the automatic control. Regarding the lens drive operation, it can also be arranged that switching between the closeup mode and the normal mode is performed in accordance with the instruction from the system controller 20.

Further, the camera controller 10 controls the charge storage time adjustment in the solid state image pickup element section 3 and the signal processing in the digital image signal processing circuit 5 to perform the exposure adjustment, or controls the digital image signal processing circuit 5 and the encoder 6 to perform setting of the image size of the pickup image.

Further, the camera controller 10 also controls the emission drive section 9 to perform the flash emission control with the shutter releasing timing. Whether or not the flash emission is performed with the shutter releasing timing is instructed by the system controller 20 as the mode of flash setting.

Further, in the case of the present embodiment, moving image data recording is also allowed in addition to the still image data recording. Whether the still image data recording is performed or the moving image recording is performed is decided based on the operation of a still image/moving image shooting mode changeover switch (not shown) provided to the operation section 21.

If it is decided that the moving image data recording is performed, the system controller 20 instructs the camera controller 10 to control the encoder 6 to encode the pickup image (moving image) supplied from the digital image signal processing circuit 5 in the form of, for example, MPEG-1.

In this case, it is arranged that commencement/termination of the moving image recording is performed in accordance with the operation of the shutter button 21a. Further, also in this case, it is also possible that the pickup image data is also supplied to the display data processing section 12 to be displayed on the display section 14 by the display drive circuit 13 so that the user can check the pickup image.

Subsequently, the reproduction mode is a mode for performing reproduction/display of the image data recorded in the recording medium.

In the reproduction mode, the image data recorded in the recording medium is reproduced and displayed. The system controller 20 controls the media drive section 16 to retrieve the image data decided as described later from the recording medium loaded thereto in response to the image pickup mode/reproduction mode changeover switch 21b designating the reproduction mode. And then, the image data is supplied to the display controller 15 as the display data. In response therewith, the display controller 15 controls the display data processing section 12 and the display drive circuit 13 so that the image data is displayed on the display section 14.

Further, selection of the image to be reproduced and displayed can be performed with the arrow key 21c in the operation section 21. The system controller 20 sequentially performs selection of the image data to be retrieved as the display image based on the collateral information (the file number or information of recording date and hour) of the image data to be recorded in the recording medium in response to the forwarding/back-feeding operation with the arrow key 21c, thereby selecting the display image data so as to be forwarded/back-fed in accordance with the order of recording, for example.

It should be noted that in this case, the display controller 15 can also be arranged to control the display data processing section 12 and the display drive circuit 13 to display the object movie or the still image supplied from the image pickup processing system as described above. Further, it can also be arranged to perform the control so that the display data as the operation menu screen, icons, or a list screen supplied from the system controller 20 is displayed.

Incidentally, as described above, the digital still camera in the background art is arranged to reproduce and display the image data (the last recorded image) recorded last before it is switched to the reproduction mode after recording the pickup image considering the convenience of checking the recorded image. On the other hand, although the digital still camera is arranged to also have the function as the reproducing device for the recorded images as understood from the above description, some image reproduction devices without the image pickup function are generally arranged to start reproducing and displaying from the last reproduced and displayed image data when restarting the image reproduction once terminated in order for enhancing the reproduction function. It is a so-called resume reproduction function.

Here, taking the digital still camera from two aspects, namely as an image pickup/recording device and as a reproducing device for the pickup/recorded image, nothing can be done better than enhancing the conveniences as both the recording device and the reproducing device. However, in the past, no proposal has been made regarding how to satisfy both of the function of reproducing the last recorded image and the resume reproduction function described above, and accordingly, the both functions are left incompatible at present.

Therefore, in the present embodiment, in order for enhancing both conveniences as the pickup image recording device and the reproducing device for the digital still camera 1, regarding the case in which reproduction/display of the image data are performed in the reproduction mode, it is arranged that when the mode is changed to the reproduction mode for the first time after the image data recording is performed in the image pickup mode, reproduction of the image data based on the last recorded image is performed, and when the mode is changed to the reproduction mode from other conditions, reproduction of the image data base on the point in which the reproduction is terminated in the previous reproduction mode.

FIGS. 2A, 2B, 3A, and 3B are views schematically shows the reproduction/display operation of the embodiment as described above.

Figure 2A:
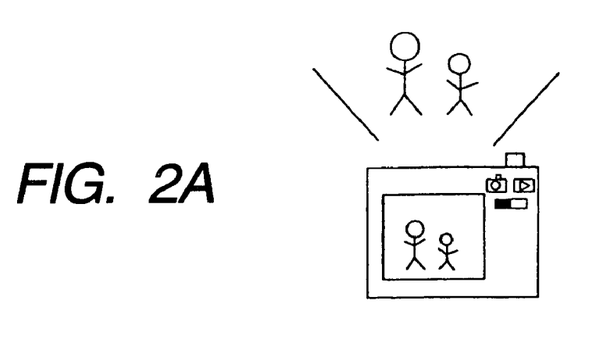
FIGS. 2A and 2B are schematic views for explaining the operation of the embodiment.

Firstly, it is assumed that the image data is picked up and recorded in the image pickup mode as shown in FIG. 2A. Although it exemplifies here the case in which only one sheet of image data is picked up and recorded in the image pickup mode, it is obvious that, in this case, the recorded image becomes the last recorded image.

Figure 2B:
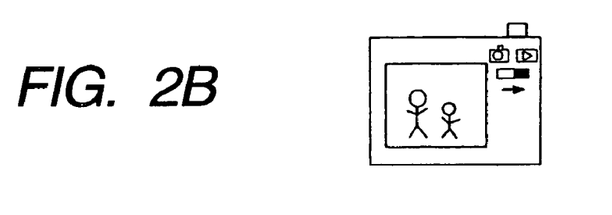

And, it is arranged that when the mode is changed to the reproduction mode for the first time after then, as shown in FIG. 2B, image reproduction based on the last recorded image, which is recorded in the previous image pickup mode, is performed. Here, there is exemplified the case in which the last recorded image is the still image data, and further, in which image reproduction is performed from the last recorded image in the reproduction mode. It is arranged that if the last recorded image is moving image data, reproduction is performed from the leading position of the moving image data as the last recorded image.

Thus, if the image pickup/recording is performed in the image pickup mode, the image reproduction based on the last recorded image can be performed when the mode is changed to the reproduction mode right thereafter. And, the user can quickly display and check the picked up and recorded image by changing the mode to the reproduction mode. As a result, the convenience as the image pickup/recording device can be enhanced.

It should be noted for confirmation that the phrase "the mode is changed to the reproduction mode for the first time after the image data recording is performed in the image pickup mode" includes not only the case in which the mode is changed to the reproduction mode immediately after the image pickup/recording is performed, but also the case in which the power is turned ON in the reproduction mode after the power has been once turned OFF, or the case in which the power is turned ON in the image pickup mode after the power has been once turned OFF and then the mode is changed to the reproduction mode.

Figure 3A:
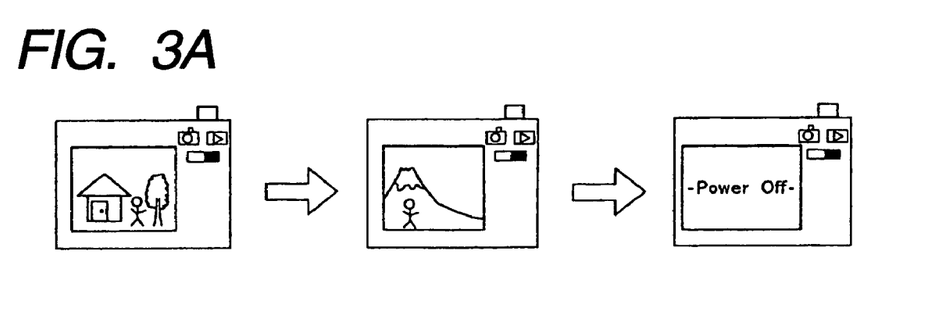
FIGS. 3A and 3B are also schematic views for explaining the operation of the embodiment.

Meanwhile, as the case in which the mode is changed to the reproduction mode from other conditions than the condition in which the image data is recorded in the image pickup mode, the case can be cited in which the power is turned OFF after the recorded images are browsed in the reproduction mode and then the power is turned ON in the reproduction mode as shown in FIG. 3A.

Figure 3B:
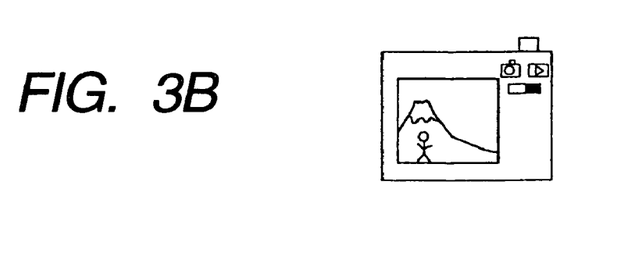

In this case, as shown in FIG. 3B, it is arranged that the reproduction of the image data is performed based on the point at which the reproduction has been terminated in the previous reproduction mode shown in FIG. 3A.

Namely, in the case with the still image data as shown in the drawing, it is arranged that the reproduction display is performed from the image data at which the previous reproduction has been terminated as the reproduction terminating point.

Further, in the case with the moving image data, it is arranged that the reproduction is started from the time point at which the previous reproduction has been terminated.

It should be noted that, as "other conditions than the condition in which the image pickup/recording is performed," other than the case in which the power is turned OFF in the reproduction mode and then the power is turned ON again in the reproduction mode as described above, the case is also included in which the mode is changed from the reproduction mode to the image pickup mode and no recording is performed. Anyway, the case in which the mode is changed from other conditions than the condition in which the image pickup/recording is performed is in the condition in which no image data recording is performed immediately prior thereto, and accordingly, it can be regarded as midstream of the image reproduction.

As described above, since the image reproduction based on the reproduction terminating point can be performed in accordance with the case regarded as midstream of the image reproduction, the convenience as the reproducing device can be maintained.

Therefore, according to the present embodiment, both of the convenience as the image pickup device capable of quickly reproducing the picked-up/recorded image data by changing the mode to the reproduction mode, and the convenience that the continuity of the reproduction images is maintained when using the image pickup device as the image reproducing device can be satisfied.

Further, such an advantage of the present embodiment can be obtained only by an operation of the image pickup mode/reproduction mode changeover, which has also been performed in the past. Further, according to this feature, it can be said that there is also an advantage that no other operation element is required for obtaining such an advantage of the present embodiment.

Namely, since no other operation element is required for selecting either one of the last recorded image and the reproduction terminating point based on which the image display is performed, no additional operation element is necessary.

Figure 4:
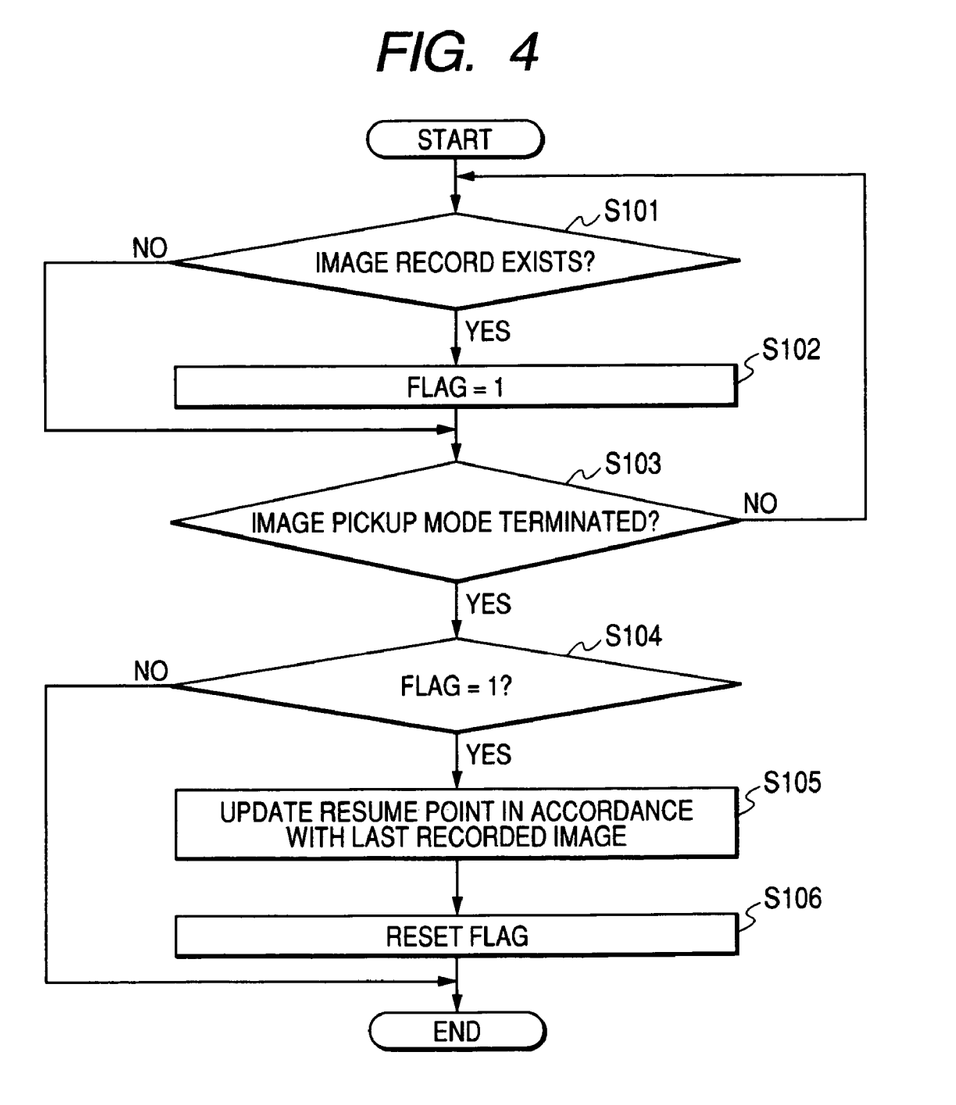
FIG. 4 is a flowchart showing a process operation to be performed in accordance with an image pickup mode as a process operation to be performed for realizing the operation of the embodiment.
Figure 5:
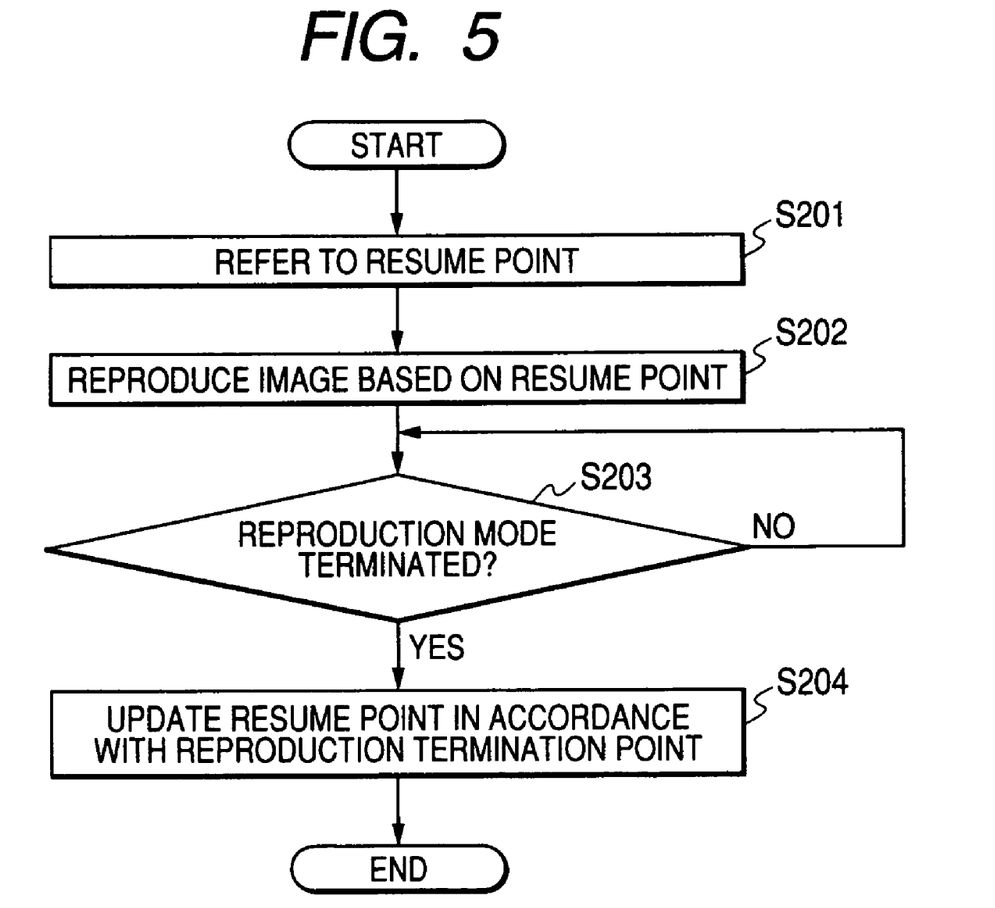
FIG. 5 is a flowchart showing a process operation to be performed in accordance with an reproduction mode as a process operation to be performed for realizing the operation of the embodiment.

FIGS. 4 and 5 are flowcharts showing the process operation to be performed for realizing the operation of the present embodiment in the above descriptions.

It should be noted that the process operation shown in FIGS. 4 and 5 is performed by the system controller 20 based on the program stored in, for example, the ROM in the memory section 19.

Firstly, FIG. 4 shows the process operation to be performed in the image pickup mode, and in FIG. 4, the explanation is made assuming that the digital still camera 1 has already been changed to the image pickup mode.

In FIG. 4, a process of discriminating whether or not the image recording has been performed is executed in the step S101. Namely, based on a holding down operation of the shutter button 21a, whether or not the still image data recording in the still image pickup mode or the moving image data recording in the moving image pickup mode has been performed is discriminated.

If a negative result that no image recording has been performed is obtained in the step S101, the process proceeds to the step S103 to perform a discrimination process about whether or not the image pickup mode has been terminated. As the cause of termination of the image pickup mode, for example, switching to the reproduction mode by the image pickup mode/reproduction mode changeover switch 21b or powering OFF by the power supply switch 21d can be cited. The system controller 20 discriminates whether or not the image pickup mode has been terminated by executing the discrimination process about whether or not either one of the above operations has been performed.

Based on the discrimination, if a negative result that the image pickup mode has not been terminated is obtained, the process is arranged to go back to the previous step S101 as described in the drawing to perform the discrimination process again about whether or not the image recording has been performed. According to the loop of the step S101→the step S103→the step S101, it is arranged to wait for either one of the image recording and the termination of the image pickup mode.

And, if a positive result that the image recording has been performed is obtained in the step S101, the process proceeds to the step S102 to set flag=1. This flag is a flag set inside the system controller 20 for confirming presence or absence of image recording in the image pickup mode, and is assumed to indicate the initial state with "0," and presence of image recording with "1" in this case.

Further, if a positive result that the image pickup mode has been terminated is obtained in the step S103, a discrimination process about whether or not flag=1 is performed in the step S104. If a negative result of flag=0 is obtained, the process operation is terminated as it stands as shown in the drawing. Namely, the image pickup mode is terminated.

On the contrary, if a positive result of flag=1 is obtained, a process of updating the resume point based on the last recorded image in the step S105.

It should be noted here that the resume point denotes information stored in the system controller 20 as information representing a point from which the image reproduction is started when the mode is changed to the reproduction mode. The information of the resume point is stored in, for example, the nonvolatile memory of the memory section 19 as described above.

In the step S105, if the last recorded image is a still image data, the system controller 20 updates the resume point by setting, for example, file number information of the still image data as the resume point. Further, if the last recorded image is moving image data, it updates the resume point by setting the time stamp information representing the leading position (the position of reproduction time=0) of the moving image data as the resume point.

It should be noted that in the step S105, the last recorded image can be specified based on, for example, the information of recording date and hour incidental to the recorded image data.

In the succeeding step S106, the flag is reset. Namely, flag=0 is set.

By resetting the flag (flag=0) at this point, it can be prevented that the resume point is updated based on the last recorded image in the case in which the mode is changed to the image pickup mode again thereafter, but no image recording has actually been performed thereafter.

Namely, thus, also in the case in which the mode is changed from the reproduction mode to the image pickup mode and then changed again to the reproduction mode without performing any image recording in the image pickup mode, the resume point can be prevented from being updated based on the last recorded image, thus making it possible to normally perform the image reproduction based on the reproduction terminating point in the previous reproducing operation.

Subsequently, FIG. 5 shows the process operation to be performed in the reproduction mode. In FIG. 5, it is assumed that the digital still camera 1 has already been changed to the reproduction mode.

Firstly, in the step S201, the resume point is referred in response to the transition to the reproduction mode.

And, in the step S202, the image reproduction based on the resume point is performed. Namely, if the information of the resume point indicates the file number of the still image, the still image data corresponding to the file number is retrieved by the media drive section 16, and is supplied to the display controller 15 to be displayed on the display section 14.

Further, if the information of the resume point is the time stamp information regarding the specific moving image data, the media drive section 16 and the display controller 15 are controlled so that the display of the moving image data begins from the position indicated by the time stamp information.

In the step S203, the process waits for termination of the reproduction mode. As the cause of termination of the reproduction mode, for example, switching to the image pickup mode by the image pickup mode/reproduction mode changeover switch 21b or powering OFF by the power supply switch 21d can be cited. The system controller 20 is arranged to wait for the termination of the reproduction mode by waiting for either one of these operation inputs.

If the reproduction mode is terminated, in the step S204, a process of updating the resume point based on the reproduction terminating point is performed.

Namely, if the image data reproduced/displayed when the reproduction mode is terminated is the still image data, the resume point is updated by setting the file number of the still image to the resume point.

Further, the image data reproduced/displayed at the termination of the reproduction mode is the moving image data, the time stamp information representing the position of the moving image data at which the reproduction is performed when the reproduction mode is terminated is stored, and by setting this information to the resume point, the resume point is updated.

Thus, in the present embodiment, the image data is reproduced/displayed based on the resume point in the transition to the reproduction mode (steps S201 and S202).

And, the resume point is updated based on the last recorded image if the image data recording is performed in the image pickup mode (step S105). Accordingly, in the case in which the mode is changed to the reproduction mode after the image data is picked-up/recorded, the image reproduction/display can automatically be performed based on the last recorded image.

In this case, it is understood that the resume point information updated based on the last recorded image is valid until it is updated (S204) based on the reproduction terminating point after moving to the reproducing mode. Accordingly, it becomes possible that the image reproduction/display based on the last recorded image is performed only when the mode is changed to the reproduction mode for the first time after the image data is picked-up/recorded. In other words, when the mode is changed to the reproduction mode in other conditions than the above (the mode is changed to the reproduction mode in other condition than the first time after the image data is picked-up/recorded), the image reproduction/display based on the resume point of the reproduction terminating point updated in the step S204 above.

As a result, according to the process operation shown in FIGS. 4 and 5, it is possible to arrange that the image reproduction (display) based on the last recorded image is performed in the case in which the mode is changed to the reproduction mode for the first time after the image data recording is performed in the image pickup mode, and the image reproduction based on the point at which the reproduction has been terminated in the previous reproduction mode in the case in which the mode is changed to the reproduction mode in other conditions than the above. And, since such an operation can be realized, as described above, both of the convenience as the image pickup device capable of quickly reproducing the picked-up/recorded image data by changing the mode to the reproduction mode, and the convenience that the continuity of the reproduction images is maintained when using the image pickup device as the image reproducing device can be satisfied.

Although the embodiment of the invention is described above, the invention should not be limited to the embodiment described above.

For example, although in the embodiment, as the image reproduction based on the resume point, particularly in the case with still image data, only one sheet of image data is displayed, it is also possible that a plurality of sheets of image data including the still image as the resume point is displayed in the case in which so-called highlight display for displaying a plurality of sheets on one screen is performed as the image display condition in the termination of the reproduction, for example.

Further, although after the reproduction mode is terminated, the resume point is set to the image displayed when the reproduction is terminated, it can also be set to the next image. Namely, in the case with the still image data, it is possible to display the still image data with the next file number, which is prepared to be displayed next, in the reproduction order, to the still image data displayed when the reproduction mode is terminated.

Further, in the case with the moving image data, it is possible to start displaying from the next point to the terminated point (e.g., the next frame, or the next point of split in the predetermined unit reproduction period).

Anyway, the advantage as the resume reproduction can be obtained by starting display from the position based on the reproduction terminating point.

Further, although in the embodiment, the resume point is updated based on the last recorded image in the termination of the image pickup mode, it is also possible that the last recorded image is specified in the termination of the image pickup mode, and the update of the resume point based on the specified information of the last recorded image is performed at the following transition to the reproduction mode.

Further, the update of the resume point based on the reproduction termination point is not necessarily performed at the termination of the reproduction mode as shown in FIG. 5 above, but can be performed at the following transition to the reproduction mode based on the termination point stored at the termination of the reproduction mode.

Further, although in the embodiment, the case in which the resume reproduction is performed on both of the still image data and the moving image data is exemplified, it is possible to configure the device so as to perform the resume reproduction on only either one of the still image data and the moving image data.

Further, although in the present embodiment, the case in which the invention is applied to the digital still camera is exemplified, it can also be applied to a digital video camera.

Also in that case, if the still image data can be recorded in addition to the moving image data, it is preferable to arrange that the resume reproduction can be performed on the both image data similarly to the above. Further, if the device is a digital video camera, it is possible to provide a viewfinder type of liquid crystal display as the display section 14.

Still further, the invention can be applied to not only such devices specialized for the camera functions, but can also be applied universally and preferably to various image pickup devices capable of recording the pickup images and reproducing the recorded images such as a mobile phone with a camera function.

It should be understood by those skilled in the art that various modifications, combinations, sub-combinations and alterations may occur depending on design requirements and other factors insofar as they are within the scope of the appended claims or the equivalents thereof.

The invention claimed is:

1. An image pickup device, comprising:
image pickup means including an image pickup lens system and an image pickup element for obtaining a pickup image;
recording means for recording image data based on the pickup image to a predetermined recording medium;
reproducing means for reproducing the image data recorded in the recording medium; and
reproduction control means for controlling switching between an image pickup mode in which the image pickup operation by the image pickup means and recording of the image data by the recording means are possible, and a reproduction mode in which the reproduction of the image data by the reproducing means is possible, for controlling the reproduction of the image data based on a last recorded image when the mode is changed to the reproduction mode for the first time after recording of the image data in the image pickup mode, and for controlling the reproduction of the image data based on a point at which the reproduction has been terminated in the previous reproduction mode when the mode is changed to the reproduction mode other than the first time after recording of the image data in the image pickup mode.

2. The image pickup device according to claim 1, wherein the reproduction control means is configured to control the reproduction of the image data based on information of a resume point when the mode is changed to the reproduction mode, and
the reproduction control means updates the resume point based on the last recorded image when the image data is recorded in the image pickup mode, and updates the resume point based on a reproduction terminating point when the reproduction mode is terminated.

3. The image pickup device according to claim 1, wherein the image data is still image data, and
the reproduction control means controls the reproduction of the still image data on which the reproduction was terminated in the previous reproduction mode as the reproduction of the image data based on the point at which the reproduction is terminated.

4. The image pickup device according to claim 1, wherein the image data is moving image data, and
the reproduction control means controls the reproduction of the moving image data so that reproduction is performed from the leading position of the last recorded image as the reproduction of the image data based on the last recorded image.

5. A reproduction control method for an image pickup device, the method comprising:

providing an image pickup device including an image pickup lens system and an image pickup element for obtaining a pickup image, a recording device for recording image data based on the pickup image to a predetermined recording medium, and a reproducing section for reproducing the image data recorded in the recording medium;

controlling switching between an image pickup mode in which the image pickup operation by the image pickup device and recording of the image data by the recording device are possible, and a reproduction mode in which the reproduction of the image data by the reproducing section is possible;

controlling the reproduction of the image data based on a last recorded image when the mode is changed to the reproduction mode for the first time after recording of the image data in the image pickup mode; and controlling the reproduction of the image data based on a point at which the reproduction has been terminated in the previous reproduction mode when the mode is changed to the reproduction mode other than the first time after recording of the image data in the image pickup mode.

6. An image pickup device, comprising:

an image pickup including an image pickup lens system and an image pickup element operable to obtain a pickup image;

a recording device that records image data based on the pickup image to a predetermined recording medium;

a reproducing section that reproduces the image data recorded in the recording medium; and a reproduction controller that controls switching between an image pickup mode in which the image pickup operation by the image pickup and recording of the image data by the recording device are possible, and a reproduction mode in which the reproduction of the image data by the reproducing section is possible, that controls the reproduction of the image data based on a last recorded image when the mode is changed to the reproduction mode for the first time after recording of the image data in the image pickup mode, and that controls the reproduction of the image data based on a point at which the reproduction has been terminated in the previous reproduction mode when the mode is changed to the reproduction mode other than the first time after recording of the image data in the image pickup mode.

* * * * *